United States Patent [19]

Barnes

[11] Patent Number: 5,056,068
[45] Date of Patent: Oct. 8, 1991

[54] APPARATUS AND METHOD FOR DETECTING SHARP SIGNAL VARIATIONS AGAINST AMBIENT SIGNALS

[75] Inventor: Ralph W. Barnes, Winston-Salem, N.C.

[73] Assignee: Accu-Sport International, Inc., Winston-Salem, N.C.

[21] Appl. No.: 475,022

[22] Filed: Feb. 5, 1990

[51] Int. Cl.⁵ .............................................. G01S 15/00
[52] U.S. Cl. .................................... 367/124; 367/901; 367/98
[58] Field of Search ................ 367/124, 125, 135, 136, 367/98, 901; 342/203

[56] References Cited

U.S. PATENT DOCUMENTS

| | | | |
|---|---|---|---|
| 3,641,267 | 2/1972 | Cavalarri | 323/287 |
| 3,975,672 | 8/1976 | Lachocki | 323/289 |
| 4,006,907 | 2/1977 | Heffley | 273/185 A |
| 4,074,325 | 2/1978 | Sakai et al. | 360/39 |
| 4,195,335 | 3/1980 | Murakami | 363/49 |
| 4,305,142 | 12/1981 | Springer | 367/127 |
| 4,322,828 | 3/1982 | Hoff et al. | 367/124 |
| 4,409,473 | 10/1983 | Furuta et al. | 250/206 |
| 4,847,817 | 7/1989 | Au et al. | 367/135 |
| 4,889,388 | 12/1989 | Hime | 297/464 |
| 4,898,388 | 2/1990 | Beard et al. | 273/118 R |

FOREIGN PATENT DOCUMENTS

WO87/05706  9/1987  United Kingdom .

Primary Examiner—Daniel T. Pihulic
Attorney, Agent, or Firm—Rhodes, Coats & Bennett

[57] ABSTRACT

For detecting a quickly or sharply varying signal (the event) against a background of a more slowly changing ambient signal (the background), the envelope detector inputs the signal and full wave rectifies it. It sends the signal to the background filter and event filter, each of which includes an RC circuit. The background filter and event filter each independently process the signal to be evaluated in different manners based on the intrinsic frequency characteristics of the event signal, and of the background signal. The outputs of the two filter sections are sent to the decision section. Based on its processing, the decision section outputs a signal in one of two states, one corresponding to detection, and the other corresponding to non-detection.

52 Claims, 3 Drawing Sheets

FIG. I (PIOR ART)

APPARATUS AND METHOD FOR DETECTING SHARP SIGNAL VARIATIONS AGAINST AMBIENT SIGNALS

BACKGROUND OF THE INVENTION

1. Field of the Invention

This invention relates to an apparatus and method for detecting a quickly or sharply varying signal against a background of a more slowly changing ambient signal.

2. Description of the Prior Art

Detection of an event in a signal is of interest in a number of different applications in different fields. For example, there are various systems for locating and identifying projectile motion and impact based on signals from sensors and transducers, such as microphones and vibration sensors. One example is described in co-pending U.S. application Ser. No. 208,673 entitled "Apparatus and Method for Determining Projectile Impact Locations, now U.S. Pat. No. 4,898,388 to Beard et al. The signals could easily be transmitted as electromagnetic radiation and picked up by antenna. As a further example, objects may be detected by means of their interference with and effect on radiation, as in radar and photoelectric cell devices. It may be helpful in order to detect the event in the signal and avoid false triggers, to screen ambient signals, referred to as "noise". For example, in the case of sound signals, the noise might correspond to wind, overhead airplanes, or nearby cars.

In U.S. Patent to Beard et al, there is illustrated and described an apparatus for determining and analyzing the impact location of golf balls. Microphones near that location pick up signals in response to the impact. Those signals are processed to identify the relative times of detecting the impact at various microphones and, by triangulation calculations, to determine the impact location. Beard notes that "it is desirable to screen out of the signals to be processed . . . randomly or slowly fluctuating background noise, which for present purposes is any signal which has a rise time significantly less than that of a ball impact sound, such as a passing automobile, wind, etc." However, the signal corresponding to the impact might be weak relative to the signal corresponding to the ambient background noise. Beard discloses broadly the use of a comparator having a predetermined and/or variable threshold for making an ongoing comparison of signals to separate detection of a sharply rising signal from detection of a more slowly rising signal and discard the latter. The instant invention is directed to an improved technique for making such comparisons for use in conjunction with systems of the type described by the Beard et al patent, as well as for use with detecting other types of events in other types of backgrounds.

The following patents are hereby referenced as being typical of the known prior art insofar as they disclose methods for screening out noise and locating and identifying objects:

| Patent No. | Inventor |
| --- | --- |
| 4,006,907 | Russell H. Heffley, Jr. |
| 4,305,142 | Barry R. Springer |
| 4,409,473 | Naofumi Furuta et ano. |
| WO 87/05706 (GB) | Dennis Brian McCarthy et al. |

Heffley discloses a transducer responsive to impact directly on a target zone. Springer discloses sensors responsive to the impact of ballistic projectiles traveling at supersonic speed. McCarthy discloses transducers responsive to shock waves created by supersonic projectiles. Furuta discloses photoelectric cells responsive to light beams reflected by or blocked by objects. All of these devices screen background noise by responding only to signals with amplitude greater than that of a predetermined or preset threshold. For example, in Furuta, that threshold is determined by the properties of a photoelectric cell, a relay, and a resistor. Such calibration is used in devices where the event signal is much stronger than the background noise signal. However, such a method is not particularly effective in systems, such as Beard et al, in which the event signal is weak relative to the ambient background noise signal.

Techniques for comparing the potential or current of one electric signal with another, reference signal, are well-known in the electric arts. Relays, Zener diodes, vacuum tubes and transistors may each be used to make such comparisons. The typical switching regulator used in power supplies has such a comparator, in which a time varying signal is compared to a constant reference voltage or current. See U.S. Pat. No. 3,975,672 issued to Eugene Lachocki; U.S. Pat. No. 4,195,335 issued to David Murakami; U.S. Pat. No. 3,641,267 issued to Eugenio Cavalarri; U.S. Pat. No. 4,074,325 to Sakai et al; and Furuta supra. As discussed above, such comparisons are not particularly effective in systems in which the event signal is weak relative to the ambient background noise signal.

Accordingly, it is a general object of this invention to detect a signal against a background signal in a manner in which constitutes an improvement over the prior art discussed above.

It is a further object of this invention to improve the accuracy of such detection when the event signal is quickly or sharply varying and the background signal is more slowly changing, by using a dynamic comparison based on the signals' different frequency characteristics.

SUMMARY OF THE INVENTION

The background filter and event filter sections each independently process a signal to be evaluated differently based on the intrinsic frequency characteristics of the event signal sought to be detected and of the background signal sought to be screened out. The output of the two filter sections are sent to a decision section. Based on its processing, the decision section outputs a signal in one of two states, one corresponding to detection and the other corresponding to non-detection.

DETAILED DESCRIPTION OF THE INVENTION

The present invention is an apparatus and method for detecting a quickly or sharply varying signal (called an event) against a background of more slowly changing ambient signal (called the background). The signal to be analyzed must have a time coordinate but otherwise be in any form, such as analog, digital, or modulated, and may be in any medium, such as, for example but not limitation, electromagnetic radiation (transmitted radio waves or signals in fiber optics are examples), acoustic waves, or electric currents.

Referring more particularly to the accompanying drawings and by way of example, the present invention will be described with particular reference to its application to the Beard et al system. There the event is an analog electric current signal corresponding to the impact of a golf ball on the ground, against a background signal corresponding to noise, for example, wind, birds, overhead airplanes, or nearby cars. However, the person skilled in communication arts will be readily able to envision applications of the invention to be described in other fields, and thus the following description is to be understood as contemplating such broader applications.

Figure 1:
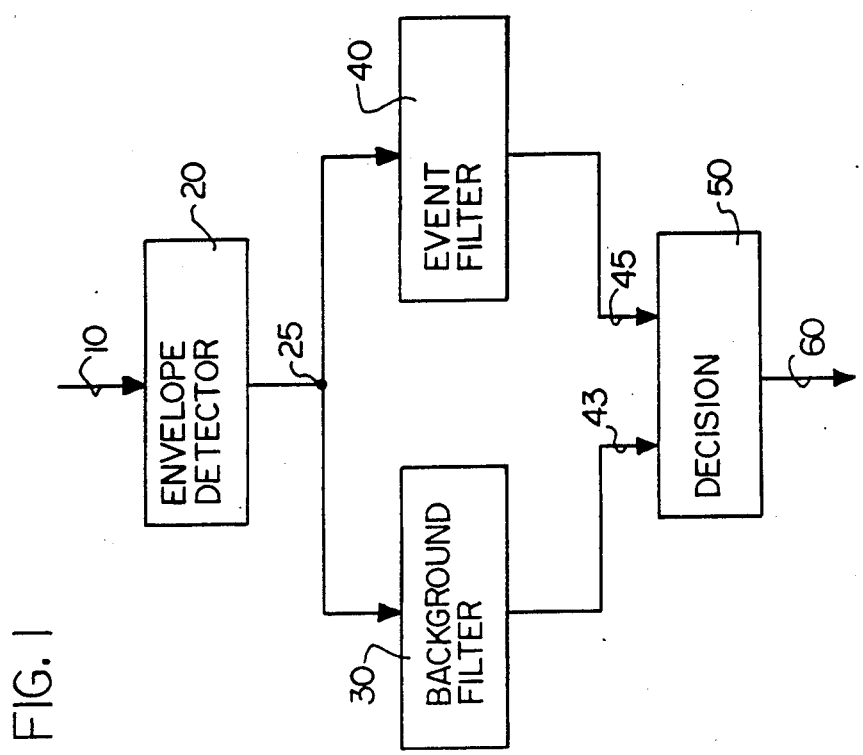
FIG. 1 is a block diagram of the invention in generalized form.

The structure of the present invention is shown in a generalized form in the block diagram of FIG. 1. The input time varying electrical signal is applied on line 10 to an envelope detector section 20. It should be recognized that the instant invention can also operate on an input signal that is either DC or AC. The envelope detector section produces the full wave rectification of the input signal and sends the result on line 25 to the background noise filter section 30 and the event filter section 40. The two filter sections 30,40 independently process their input signals. In one embodiment, they process the signals simultaneously. The event filter section has a wider band pass than the background filter section, thereby allowing the short time duration, or higher frequency component, event signal to pass the event filter section but be attenuated in the more narrow band pass background filter section. The output of the background filter and event filter sections are sent on lines 43 and 45, respectively, to the decision section 50.

The output 60 of the decision section is a signal in one of two states corresponding to event detection and non-detection, and having a time coordinate related to the time coordinate of the signal to be analyzed. As with the input signal, the output signal may be in any form and medium, for example, the states may be binary electric current signals, such as pulses or two different voltage levels, and may even be the visible state of a pilot light.

The decision 50 section makes a comparison of an event filter base reference based on the output of the event filter section 40 with a background filter base reference based on the output of the background filter section 30. If the former exceeds the latter by more than a predetermined threshold, the output signal indicates detection. Otherwise, it indicates non-detection.

In one embodiment, the comparison is based on the average values in the envelopes. In another embodiment, it is based on the maximum value in the envelopes. In still another embodiment, the comparison is instantaneous.

Figure 3A:
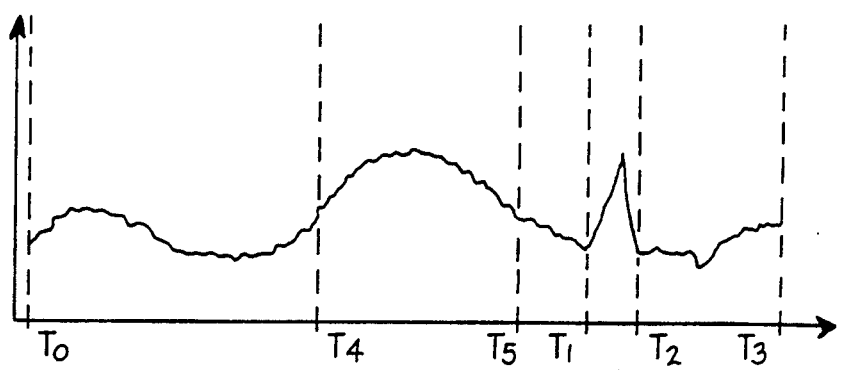
FIG. 3, consisting of 3A, 3B, 3C and 3D, is a representation of various waveforms useful in explaining the operation of the embodiment of the invention shown in FIG. 2.
Figure 3B:
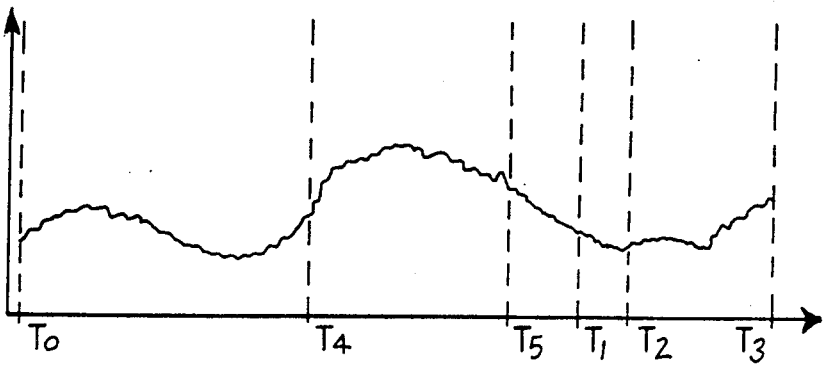

FIG. 3A shows a representative waveform of the envelope of the signal from line 25 which includes the event and the background. Under such circumstances, FIG. 3A also shows a representative waveform of the signal at line 45, the output of the event filter section, and FIG. 3B shows a representative waveform of the signal at line 43, the output of the background filter section. If instantaneous comparison were used, the output signal would indicate detection during the period $T_1$ through $T_2$ and non-detection during the period $T_0$ through $T_1$ and $T_2$ through $T_3$ because the output of the event filter section exceeds the output of the background filter section during the period $T_1$ through $T_2$ only. FIG. 3D is representative of the output signal at line 60 in the embodiment using different voltage levels to indicate detection and non-detection states.

FIG. 3B would be representative of the waveform of the signal from line 25 which included only the background and no event. It would also be representative of the signal as lines 45 and 43, the output of the background and filter sections, respectively. Since the former does not exceed the latter, the output signal would indicate non-detection during the period $T_0$ through $T_3$.

Figure 3C:
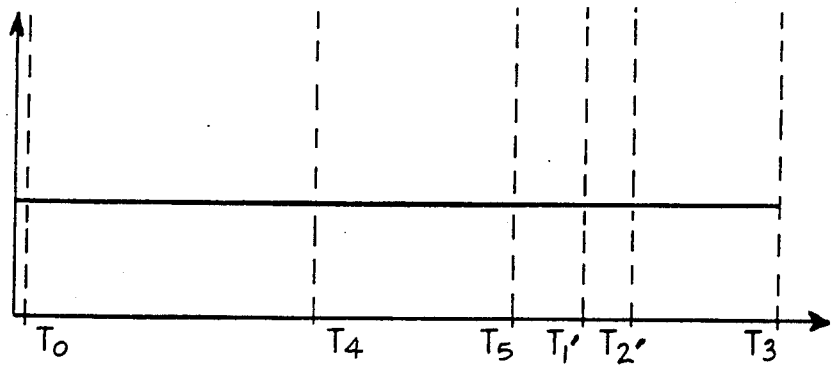
Figure 3D:
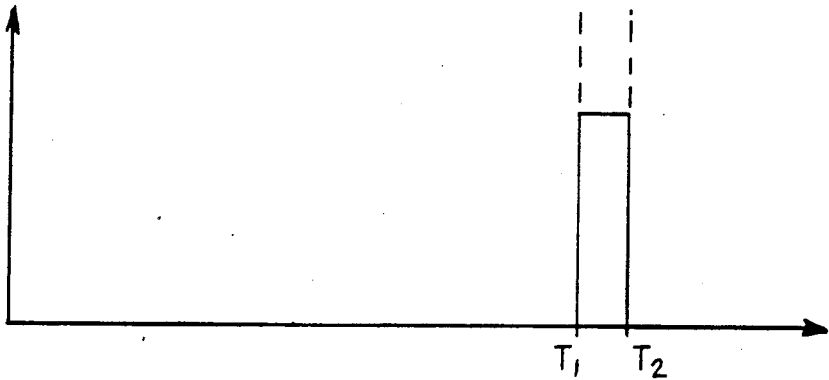

FIG. 3C shows a fixed reference signal as was used in the prior art. It is to be noted that if this signal, rather than the responsive background filter base reference, were used for comparison, then the output signal would indicate detection during the period $T_4$ through $T_5$ as well as $T_{1'}$ through $T_{2'}$.

Figure 2:
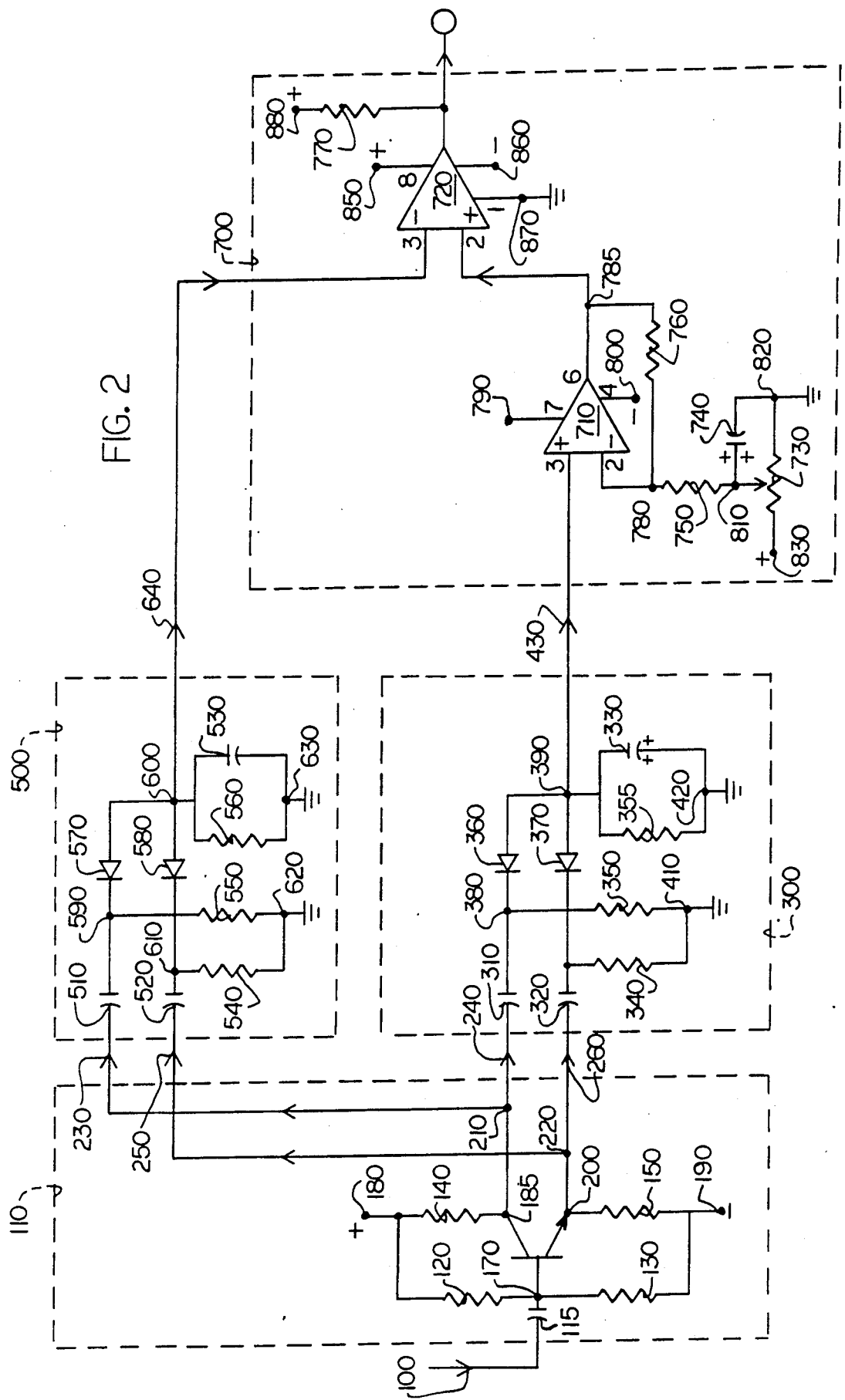
FIG. 2 is schematic electrical diagram showing one embodiment of the invention.

Referring now to FIG. 2, a schematic diagram is shown of the electrical circuit corresponding to an embodiment of the invention designed to detect an event corresponding to the impact of a golf ball on the ground, which event has significant spectral frequencies in the range of about 600 to 1200 Hz. and is of about 1-3 millisecond duration against the background corresponding to background noises, which varies relatively slowly in amplitude and has relatively long time duration and lower spectral frequencies.

The input time varying signal to be evaluated on line 100 is applied to envelope detector section 110 which comprises an NPN transistor 112, a capacitor 115, and resistors 120,130,140,150 arranged as illustrated in FIG. 2.

The input to background filter section 300 is on lines 240,260. Background filter section 300 comprises capacitors 310,320,330, resistors 340,350,355, and diodes 360,370 arranged as illustrated.

The input to event filter section 500 is on lines 230,250. Event filter section 500 comprises capacitors 510,520,530, resistors 540,550,560, and diodes 570,580 arranged as illustrated.

The inputs to decision section 700 are the output from background filter section 300 on line 430 and the output from event filter section 500 on line 640. Decision section 700 comprises operational amplifiers 710,720, potentiometer 730, capacitor 740, and resistors 750,760,770 as illustrated.

Given below by way of example are some technical data pertinent to the embodiment of the invention depicted in FIG. 2:

| Resistor | |
| --- | --- |
| 120 | 12 kohms. |
| 130 | 6800 ohms. |
| 140 | 2200 ohms. |
| 150 | 1800 ohms. |
| 340, 350, 540, 550 | 47 kohms. |
| 355 | 330 kohms. |
| 560 | 22 kohms. |
| 750 | 220 kohms. |
| 760 | 10 ohms. |
| 770 | 4700 ohms. |
| Capacitor | |
| 115, 310, 320, 510, 520 | 0.47 microfd. |
| 330 | 10 microfd. |
| 530 | 0.33 microfd. |
| 740 | 22 microfd. |
| Transistor 112 | 2N4124 |
| Diodes 360, 370, 570, 580 | 1N270 series |
| Component 710 | 741 oper. amp. |

-continued

| Component 720 | 311 oper. amp. |
| Component 730 | 5 kohm. (10T) potentiometer w/tap |

The above values for components in the background filter section 300 give it an RC time constant of about 2.5 seconds. Similarly, the above values for components in the event filter section 500 give it an RC time constant of about 20 milliseconds. The output waveforms for both filter sections are inverted with respect to their input waveforms.

Positive bias terminals 180,790,850 are biased to +12 volts. Negative bias terminals 190,800,860 are biased to −12 volts. Terminals 830,880 are biased to +5 volts. Terminals 410,420,620,630,820,870 are grounded. Potentiometer 730 is adjusted so that junction 785 has −0.15 volts fixed bias.

If the input signal appearing on line 100 were saturated at about 11 volts peak to peak, then the output of the event filter section at line 640 would be about 2 volts peak. Operational amplifier 720 inverts and amplifies this signal, which constitutes the event filter base reference. Operational amplifier 720 compares it with an amplification of the signal on line 835, which reflects a threshold value of −0.15 volts added to the inverted and amplified output of the background filter section 300, and constitutes the background filter base reference. In other words, the detection circuit section 700 makes an instantaneous comparison based on the output of the event filter section and the output of the base filter section plus a predetermined threshold of 0.15 volts. If the former exceeds the latter, the output signal indicates detection; otherwise it indicates non-detection. In this particular embodiment, the states of detection and non-detection are distinguished by binary signals of two different voltages.

The above-described embodiments are merely illustrative of the principles of the invention. It will be apparent, for example, that the background and event filter sections 300,500 respectively can be easily modified while still incorporating the spirit and scope of the RC circuits described above. Similarly, the decision section 700 can be easily modified by using different operational amplifiers, different numbers of operational amplifiers, and different configurations of operational amplifiers or different components while still incorporating the spirit and scope of this section as described above. As a further example, the processing need not be done in real time and different times. Numerous variations and modifications in the above-described systems and in the components thereof will be readily apparent to those skilled in the art without departing from the spirit and scope of the invention as expressed in the appended claims.

What is claimed is:

1. An apparatus for detecting an event against background in an input time varying signal having an input time coordinate, which comprises:
   a) envelope detector means for receiving the input signal and providing equivalent first and second envelope detector outputs in response thereto;
   b) background filter means for inputting the first envelope detector output and providing a background filter output responsive thereto;
   c) event filter means for inputting the second envelope detector output and providing an event filter output responsive thereto, the background filter means and the event filter means independently providing a background filter output and an event filter output, and the background filter output and event filter output differing in response to at least one particular input signal;
   d) decision means for making a comparison between a background filter base reference responsive to the background filter output and an event filter base reference responsive to the event filter output, and providing an output signal having an output signal time coordinate related to the input signal being in either a detection state or a non-detection state, but not both, in response to the background filter base reference and the event filter base reference.

2. An apparatus according to claim 1 wherein the background filter means and the event filter means cause said outputs to differ in response to an envelope detector output indicative of an event which is quickly or sharply varying in comparison with the background.

3. An apparatus according to claim 2 wherein the background filter means further include a means for providing a background filter output responsive to the frequency components of the first envelope detector output, and the event filter means further include a means for providing an event filter output responsive to the frequency components of the second envelope detector output.

4. An apparatus according to claim 3 wherein the input signal is a time varying electric analog signal.

5. An apparatus according to claim 4 wherein the envelope detector further includes means for providing an envelope of the input signal in the first and second envelope detector outputs.

6. An apparatus according to claim 3 wherein the event filter base reference is always of an amplitude at least as great as the background filter base reference.

7. An apparatus according to claim 3 wherein the background filter base reference is always of an amplitude at least as great as the event filter base reference.

8. An apparatus according to claim 3 wherein the background filter means has an RC circuit, the event filter means has an RC circuit, and the RC time constant for the background filter means is greater than the RC time constant for the event filter means.

9. An apparatus according to claim 6 wherein the output signal is in the detection state in response to the event filter base reference being of greater amplitude than the amplitude of the background filter base reference plus a threshold, and is in the non-detection state otherwise.

10. An apparatus according to claim 7 wherein the output signal is in the detection state in response to the background filter base reference being of amplitude greater than the amplitude of the event filter base reference plus a threshold, and is in the non-detection state otherwise.

11. An apparatus according to claim 9 wherein the event filter base reference is based on an average value of the event filter output.

12. An apparatus according to claim 9 wherein the background filter base reference is based on an average value of the background filter output.

13. An apparatus according to claim 9 wherein the event filter base reference is based on an average value of event filter output and the background filter base reference is based on an average value of background filter output.

14. An apparatus according to claim 10 wherein the event filter base reference is based on an average value of the event filter output.

15. An apparatus according to claim 10 wherein the background filter base reference is based on an average value of the background filter output.

16. An apparatus according to claim 10 wherein the event filter base reference is based on an average value of event filter output and the background filter base reference is based on an average value of background filter output.

17. An apparatus according to claim 9 wherein the event filter base reference is based on the maximum value of the event filter output.

18. An apparatus according to claim 9 wherein the background filter base reference is based on the maximum value of the background filter output.

19. An apparatus according to claim 9 wherein the event filter base reference is based on the maximum value of the event filter output and the background filter base reference is based on the maximum value of the background filter output.

20. An apparatus according to claim 10 wherein the event filter base reference is based on the minimum value of the event filter output.

21. An apparatus according to claim 10 wherein the background filter base reference is based on the minimum value of the background filter output.

22. An apparatus according to claim 10 wherein the event filter base reference is based on the minimum value of the event filter output and the background filter base reference is based on the minimum value of the background filter output.

23. An apparatus according to claim 9 wherein the event filter base reference is instantly responsive to the event filter output and the background filter base reference is instantly responsive to the background filter output.

24. An apparatus according to claim 10 where in event filter base reference is instantly responsive to the event filter output and the background filter base reference is instantly responsive to the background filter output.

25. An apparatus according to claim 23 wherein all means are instantly responsive and the output signal time coordinate is equivalent to the input signal time coordinate.

26. An apparatus according to claim 25 wherein the input signal is a time varying electric analog signal, the envelope detector further includes means for providing an envelope of the input signal in the first and second envelope detector output, the background filter means has an RC circuit, the event filter means has an RC circuit, and the RC time constant for the background filter means is greater than the RC time constant for the event filter means.

27. A method for detecting an event against background in a time varying input signal having an input signal time coordinate, which comprises:
 a) receiving the input signal and providing equivalent first and second envelope detector outputs in response thereto;
 b) filtering the first envelope detector output with a background filter and providing a background filter output responsive thereto;
 c) filtering the second envelope detector output with an event filter and providing an event filter output responsive thereto, the background filtering step and the event filtering step independently providing a background filter output and an event filter output, and the background filter output and event filter output differing in response to at least one particular input signal;
 d) comparing a background filter base reference responsive to the background filter output and an event filter base reference responsive to the event filter output, and providing an output signal having an output signal time coordinate related to the input signal time coordinate, the output signal being in either a detection state or a non-detection state, but not both, in response to the background filter base reference and the event filter base reference.

28. A method according to claim 27 wherein receiving step includes receiving an input signal which includes a component indicative of an event which is quickly or sharply varying in comparison to the background.

29. A method according to claim 28 wherein the background filtering step further includes a step of providing a background filter output responsive to the frequency components of the first envelope detector output, and the event filtering step further includes a step of providing an event filter output responsive to the frequency components of the second envelope detector output.

30. A method according to claim 29 wherein the input signal is a time varying electric analog signal.

31. A method according to claim 30 wherein the receiving step further includes providing an envelope of the input signal in the first and second envelope detector output.

32. A method according to claim 29 wherein the event filter base reference is always of an amplitude at least as great as the background filter base reference.

33. A method according to claim 29 wherein the background filter base reference is always of an amplitude at least as great as the event filter base reference.

34. A method according to claim 29 wherein the background filtering step includes filtering with a background RC time constant, the event filtering step includes filtering with an event RC time constant and the background RC time constant is greater than the event RC time constant.

35. A method according to claim 32 wherein the output signal is in the detection state in response to the event filter base reference being of greater amplitude than the amplitude of the background filter base reference plus a threshold, and is in the non-detection state otherwise.

36. A method according to claim 33 where in the output signal is in the detection state in response to the background filter base response being of amplitude greater than the amplitude of the event filter base reference plus a threshold, and is in the non-detection state otherwise.

37. A method according to claim 35 wherein the event filter base reference is based on an average value of the event filter output.

38. A method according to claim 35 wherein the background filter base reference is based on an average value of the background filter output.

39. A method according to claim 35 wherein the event filter base reference is based on an average value of event filter output and the background filter base reference is based on an average value of the base filter output.

40. A method according to claim 36 wherein the background filter base reference is based on the maximum value of background filter output.

41. A method according to claim 36 wherein the event filter base reference is based on the maximum value of the event filter output and the background filter base reference is based on the maximum value of the background filter output.

42. A method according to claim 36 wherein the event filter base reference is based on the minimum value of the event filter output.

43. A method according to claim 35 wherein the event filter base reference is based on the maximum value of the event filter output.

44. A method according to claim 35 wherein the background filter base reference is based on the maximum value of background filter output.

45. A method according to claim 35 wherein the event filter base reference is based on the maximum value of the event filter output and the background filter base reference is based on the maximum value of the background filter output.

46. A method according to claim 36 wherein the event filter base reference is based on the maximum value of the event filter output.

47. A method according to claim 36 wherein the background filter base reference is based on the minimum value of the background filter output.

48. A method according to claim 36 wherein the event filter base reference is based on the minimum value of the event filter output and the background filter base reference is based on the minimum value of the background filter output.

49. A method according to claim 35 wherein the event filter base reference is instantly responsive to the event filter output and the background filter base reference is instantly responsive to the background filter output.

50. A method according to claim 36 wherein the event filter base reference is instantly responsive to the event filter output and the background filter base reference is instantly responsive to the background filter output.

51. A method according to claim 49 wherein all steps are instantly responsive and the output signal time coordinate is equivalent to the input signal time coordinate.

52. A method according to claim 51 wherein the input signal is a time varying electric analog signal, and the receiving step further includes providing an envelope of the input signal in the first and second envelope detector output, the background filtering step includes filtering with a background RC time constant, the event filtering step includes filtering with an event RC time constant, and the background RC time constant is greater than the event RC time constant.

* * * * *